Nov. 19, 1968  C. H. WHITE ET AL  3,411,824
RUBBER DIAPHRAGM SUPPORT FOR BUCKET SEATS
Filed March 17, 1967  2 Sheets-Sheet 2

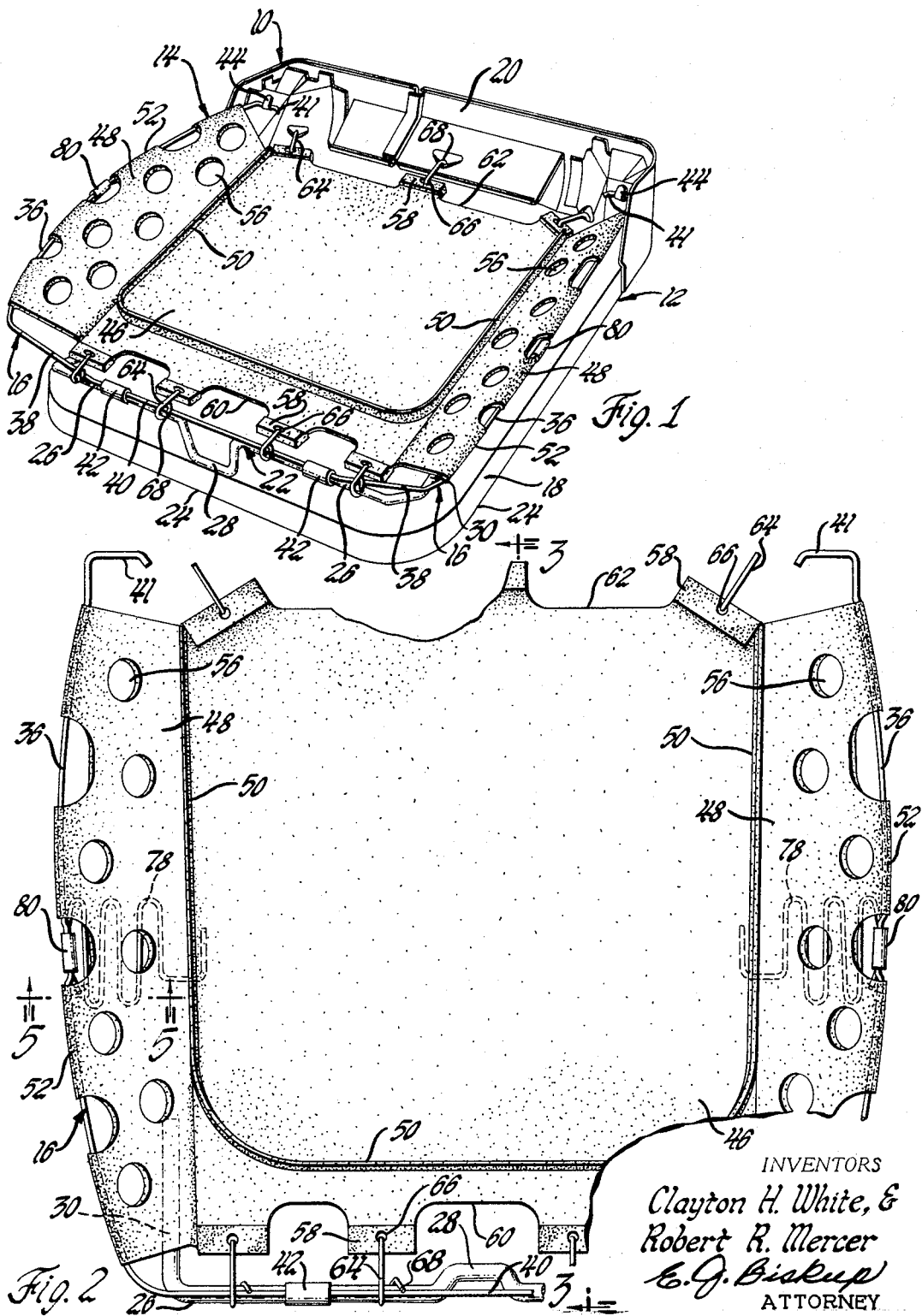

INVENTORS
Clayton H. White, &
Robert R. Mercer
C. J. Biskup
ATTORNEY

United States Patent Office 3,411,824
Patented Nov. 19, 1968

3,411,824
RUBBER DIAPHRAGM SUPPORT FOR BUCKET SEATS
Clayton H. White, Mount Clemens, and Robert R. Mercer, Warren, Mich., assignors to General Motors Corporation, Detroit, Mich., a corporation of Delaware
Filed Mar. 17, 1967, Ser. No. 623,946
8 Claims. (Cl. 297—452)

ABSTRACT OF THE DISCLOSURE

A seat construction having a frame member supporting a diaphragm type load supporting section including integrally formed side members. The diaphragm is supported fore and aft by attaching tabs formed integrally with the diaphragm to the front and rear of the frame member. The edges of the side membranes are supported by a border wire, the ends of which are attached to the front and rear sections of the frame member.

In recent years, bucket type seats have become increasingly popular. However, to achieve the lower silhouette and contoured structure desirable from a styling standpoint in such seats, certain structural comprises are necessary. For example, the lower silhouette requires a reduction in padding thickness as well as a decrease in permissible deflection of the seating unit. In conventional bucket seats using a corrugated spring unit, the reduction in seat thickness causes hard spots where the structural members interfere with the deflection of the seat and on rough roads the seats may "bottom out." Strengthening the springs helps to eliminate the deflection problems but, at the same time, produces a seat firmness undesirable to many people.

It has been recognized that a seat construction using a flexible diaphragm base could be used to overcome some of the problems described above. Thus, by using a flexible diaphragm suspension, the seat deflection can be controlled, seat thickness can be reduced, static response to shock and vibration is possible, and seat construction can be simplified. However, the suspension of the diaphragm creates new difficulties. For example, if the side frame members are raised to support the diaphragm, the seat occupant must endure some undesirable body movements in order to clear the frame members when entering or leaving the vehicle. Also, to achieve styling features of the front overhang and side wing buildup, special padding is required because these sections are essentially unsupported. Thus, hard spots are still present at the support points.

A seat made in accordance with the present invention overcomes these problems by providing a new and useful suspension for the flexible diaphragm. Basic suspension for the diaphragm is realized by attachment of the latter to the front and rear portions of a frame member. Side membranes, formed integrally with the diaphragm, are attached to a border wire which is in turn attached to the frame member. In addition to providing side support for the diaphragm, the side membranes and border wire provide a yieldable support for the side padding and may be contoured to define various styling shapes.

Accordingly, the objects of the present invention are; to improve the ride characteristics in a seat construction utilizing a resilient load supporting diaphragm; to provide a resilient diaphragm type seat construction easily adaptable to styling changes by attachment of the diaphragm sides to a contourable border wire; to provide a resilient diaphragm seat construction wherein hard spots due to structural interferences are eliminated by sidewardly attaching the diaphragm to a deflectable border wire; to provide a new and useful method for suspending the sides of a flexible load support diaphragm by integrally forming side membranes thereon and attaching the edges of the membranes to a contourable and deflectable border wire; and to provide a diaphragm type load support for a contoured seat construction by having the load support area connected to angularly disposed membranes.

These and other objects will be apparent to one skilled in the art upon reading the following detailed description, reference being made to the accompanying drawings in which:

FIGURE 1 is a perspective view of a seat construction made in accordance with the present invention.

FIGURE 2 is an enlarged plan view of the flexible diaphragm and support structure of the seat shown in FIGURE 1.

Figure 3:
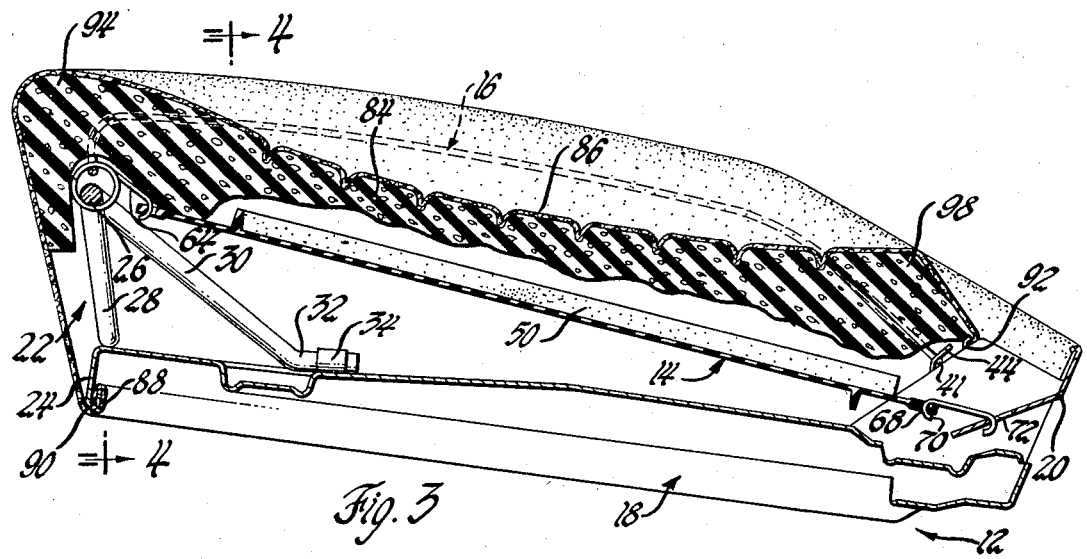
FIGURE 3 is a cross-sectional elevation view of the seat construction shown in FIGURE 1 with padding and exterior covering added.
Figure 4:
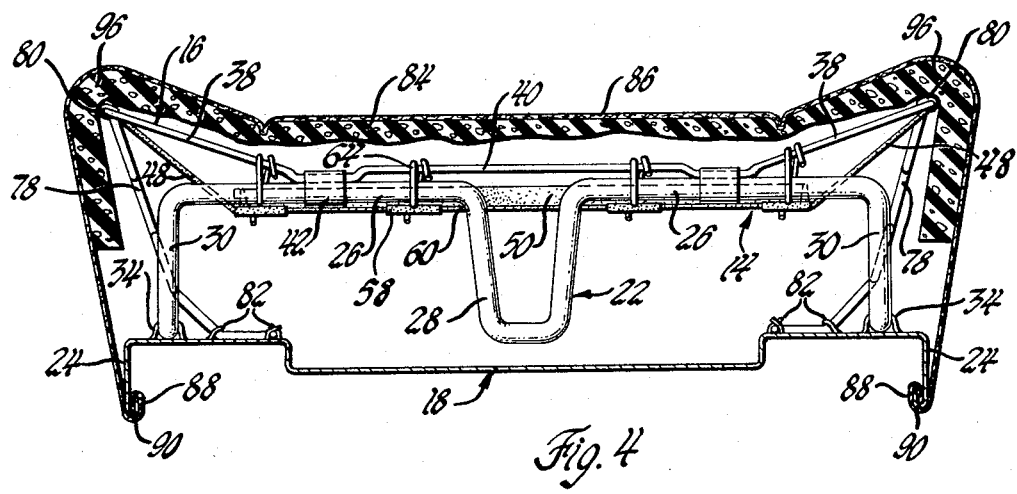
FIGURE 4 is a view taken along line 4—4 of FIGURE 3.

Referring to FIGURE 1, the seating unit 10, in general, comprises a frame member 12, a flexible diaphragm 14 and a border wire 16. More specifically, and as also seen in FIGURE 3 and 4, the frame 12 includes a bottom support pan 18, a rear support plate 20, and a front support bar 22. The bottom support pan 18 may be of any size and shape adapted to be fitted on a conventional fore and aft seat adjusting mechanism and is preferably a one-piece metal stamping. In the present invention, the exterior side edges 24 of the bottom support pan 18 define the desired bottom contour of the seating unit 10 and, as will be explained more fully below, fastening means are provided for attaching an exterior cover thereto. The front support bar 22 is preferably formed of metal tubing and comprises horizontal traversely extending front mounting sections 26, a centrally located U-shaped section 28, downwardly and rearwardly extending support arms 30, and backwardly extending end sections 32 attached to the bottom support pan 18 by any suitable means such as straps 34 formed in the bottom support pan 18. The rear support plate 20 is rigid with the bottom support pan 18 and may take various shapes but should have adequate strength and rigidity to support the diaphragm 14 and a seat back rest, not shown.

The border wire 16 is formed of a single wire having a circular cross section and includes contoured sides 36, downwardly and inwardly extending wings 38, a horizontal front section 40, and inwardly extending free ends 41. The front section 40 is attached by clips 42 to the front support bar 22 and the free ends 41 are secured to the rear support plate 20 by hooks 44 formed therein. Obviously, the border wire could be made in two symmetrical pieces without impairing its function.

The diaphragm 14 comprises a substantially rectangular base 46 and outwardly extending side membranes 48. The base 46 and side membranes 48 may be formed of any elastomeric material, such as rubber, having suitable resilient characteristics. Additionally, metal plates and wires, not shown, may be molded into the base 46 to distribute the tensile load and to reduce stress concentration at the attachment points. A vertically extending ridge 50 is integrally formed along the sides of and adjacent the front edge of the base 46 and prevents the seat padding from shifting.

Figure 5:
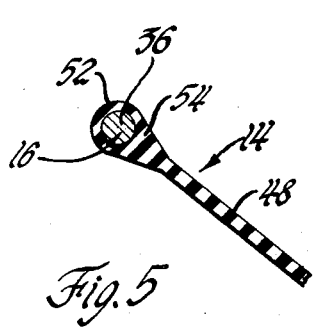
FIGURE 5 is a view taken along line 5—5 of FIGURE 2.

As shown in FIGURE 5, the edge 52 of the side membrane 48 terminates in an enlarged bead portion 54 which in the preferred form is integrally formed with the border wire during the diaphragm molding operation. A plurality of ventilation holes 56 are formed in each of the side membranes 48 to permit air passage therethrough during compression and expansion of the seat padding.

Figure 6:
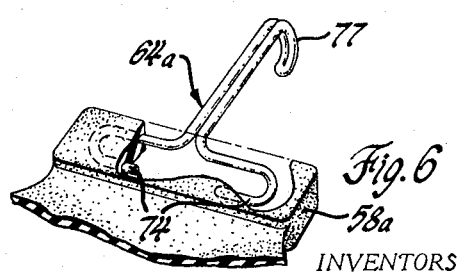
FIGURE 6 is a modification of the tab structure shown in FIGURES 1 through 4.

Integral tabs 58 are formed on the front edge 60 and the rear edge 62 of the base 46. Inasmuch as most of the stretch in the diaphragm occurs in the tabs, the length, cross-sectional area, and number of these tabs can be varied according to known interrelationships to achieve the desired firmness in the seating unit 10. Fasteners 64 are inserted through holes 66 formed in the tabs 58 to suspend the diaphragm 14 fore and aft. The fasteners 64 are secured frontally by coiling the free end 68 about the front support bar 22 and the border wire 16, and rearwardly by bending over the free end 68 to form a hook 70 and inserting it through apertures 72 formed in the rear support plate 20. A modification of the tab portion is shown in FIGURE 6 wherein the fastener 64a is formed into the tab 58a during the diaphragm molding operation and comprises retaining arms 74 and a hooked end 77.

Additional support may be given to the side of the seat by interposing a conventional corrugated spring 78 between the bottom support pan 18 and the border wire 16. The spring 78 is attached to the border wire 16 by means of a clip 80 and to the bottom support pan 18 by bending over the tabs 82 formed thereon.

Referring to FIGURES 3 and 4, the assembled seating unit 10 is cushioned by a contoured pad 84 and an exterior covering 86. The bottom edges 88 of the covering are secured along the exterior side edges 24 of the bottom support pan 18 by folding the material into the retaining channels 90 and at the rear by a similar channel 92 formed in the rear support plate 20. It should be readily apparent that sufficient padding can be provided in the overhang area 94, the deflectable wing area 96 and the rear support region 98 to substantially eliminate hard spots caused by the frame 12 interfering with the deflection of the seat while at the same time providing a seat construction adaptable to wide variations in styling.

Inasmuch as certain changes and modifications will be obvious to one skilled in the art, the scope of the invention, as defined by the appended claims, is intended to cover such alterations of the above-described embodiment.

We claim:
1. A vehicle seat comprising a frame member, a border wire disposed above the sides of said frame member and having laterally extending side portions and downwardly extending end portions, said end portions attached to said frame member, load support means attached fore and aft to said frame member and attached at the sides thereof to said side portions of said border wire, the load support means comprising a resilient diaphragm having a substantially rectangular base and upwardly outwardly extending side membranes, a plurality of tabs disposed fore and aft of the load support means and formed integrally with said base, and means for attaching said tabs to said frame member.

2. A vehicle seat as recited in claim 1 wherein spring means are interposed between said frame member and said side portion of the border wire.

3. A vehicle seat as recited in claim 1 wherein apertures are formed in said tabs and hooks attached to said frame member are inserted therethrough to suspend said base fore and aft.

4. A vehicle seat as recited in claim 1 wherein fasteners are formed with said tabs, said fasteners attaching to said frame member to suspend said base fore and aft.

5. In a vehicle seat, a frame member, a border wire disposed above the sides of said frame member, said border wire having laterally extending side portions and downwardly extending end portions, said end portions attached fore and aft to said frame member, a resilient diaphragm having a substantially rectangular base and integrally formed upwardly extending side membranes, said side membranes attached to said side portions of said border wire, a plurality of tabs disposed fore and aft on said base, apertures formed in said tabs, hooks attached to said frame member, said hooks inserted through said apertures to suspend the diaphragm fore and aft, corrugated springs interposed between and attached to said frame member and said side portion of said border wire and a contoured covering including padding enclosing said seat.

6. A border wire for use with the seat construction having a frame member supporting a diaphragm-type load supporting section including integrally formed side membranes, said border wire adapted to support said side membranes and comprising a side portion with one end thereof attachable to the rear of the frame member, the other end of said side portion having a wing section bent inwardly and extending downwardly for attachment to the front of said frame member.

7. A border wire as recited in claim 6 wherein the inwardly and downwardly extending ends are integrally connected so as to form a single continuous generally U-shaped border wire.

8. A vehicle seat construction comprising a frame member, a generally U-shaped border wire including side portions and a front section, each of said side portions being connected to the front section by a downwardly extending wing section, means attaching the free ends of the side portions and the front section of the border wire to the frame member whereby the side portions are generally located in a plane vertically spaced above the front section, a resilient diaphragm having a substantially rectangular base integrally formed with side membranes, and means connecting the fore and aft portions of the base to the frame member and the side membranes to the border wire side portions so that the side membranes are angularly disposed relative to the base.

References Cited
UNITED STATES PATENTS

| | | | |
|---|---|---|---|
| 3,198,578 | 8/1965 | Geoffrey et al. | 297—452 X |
| 3,208,085 | 9/1965 | Grimshaw | 5—345 |
| 3,217,786 | 11/1965 | Earl | 297—452 X |
| 3,291,530 | 12/1966 | Harrison | 297—456 X |
| 3,329,466 | 7/1967 | Getz et al. | 297—452 X |
| 3,323,836 | 6/1967 | Hunt | 297—456 |

CASMIR A. NUNBERG, *Primary Examiner.*